Sept. 19, 1967     T. M. WILLIAMS     3,341,906
MAGNETIC SAFETY BELT FASTENER
Filed June 2, 1966
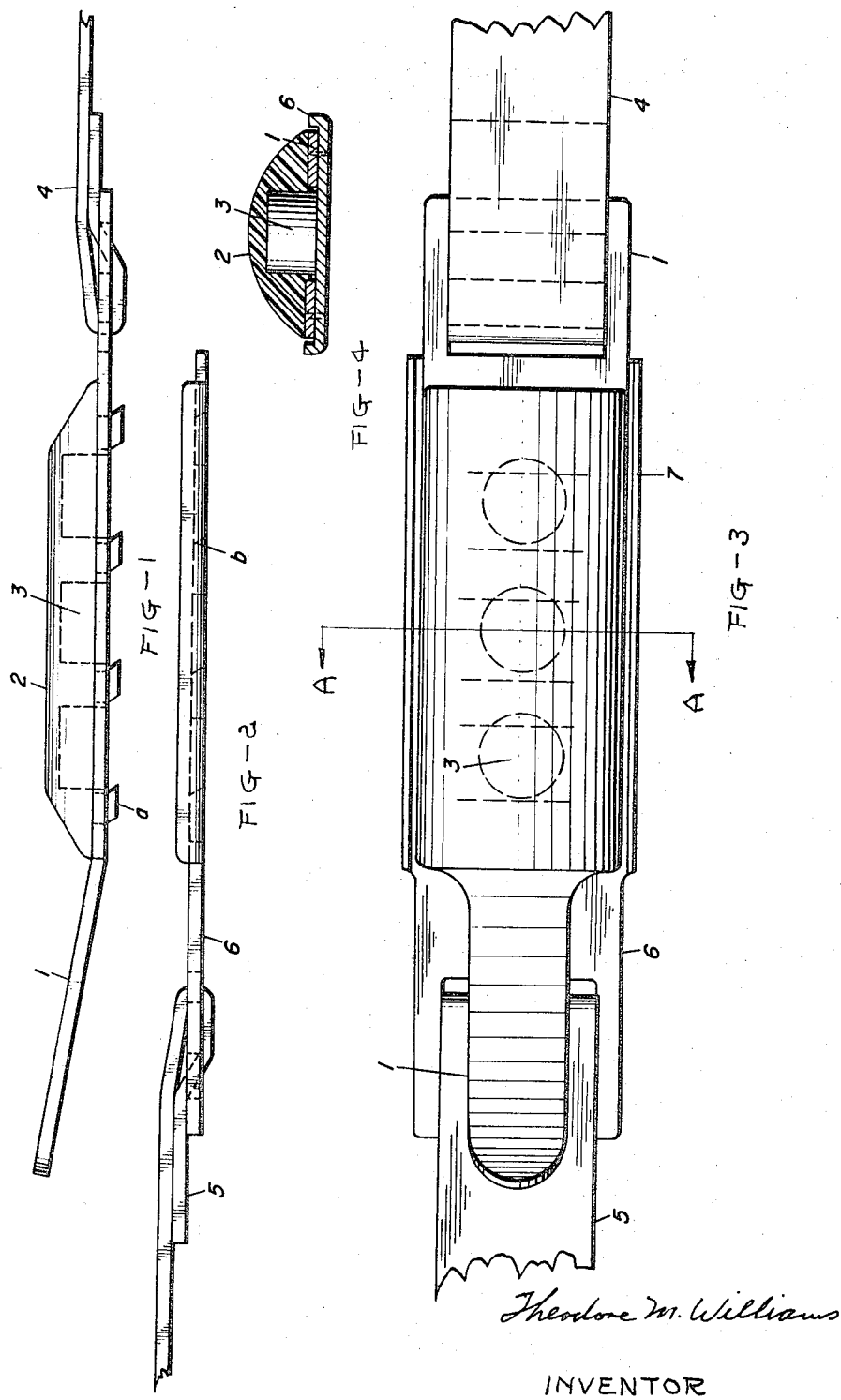
*Theodore M. Williams*
INVENTOR United States Patent Office 3,341,906
Patented Sept. 19, 1967

3,341,906
MAGNETIC SAFETY BELT FASTENER
Theodore M. Williams, Volusia, Fla.
(600 White St., Daytona Beach, Fla. 32014)
Filed June 2, 1966, Ser. No. 554,893
5 Claims. (Cl. 24—206)

ABSTRACT OF THE DISCLOSURE

A seat belt fastener comprising fastener halves mechanically connected by prongs on one fastener half engaging in slots in the other fastener half, and which are additionally held together by magnetic attraction when the prongs are engaging in the slots. The prongs and slots are inclined so that normal pulling forces exerted on the fastener halves will tend to draw the fastener halves together. The fastener halves are constructed to enable them to be readily distinguished in the dark for connection, and to facilitate quick release thereof.

---

This invention relates to a magnetic seat belt fastener for use in automobiles, airplanes and the like, the principal object of which is to provide a seat belt fastener that is easy for the user to fasten and to release in emergencies.

Another object of the invention is to provide a fastener that will fasten itself when the two halves of the fastener are within the magnetic field of the respective two parts of the fasteners.

A still further object is to provide a fastener including an inner half having a smooth inner side disposed next to the body of the wearer, and an outer half having a slightly uneven outer side which may be easily identified in the dark by the user.

A preferred embodiment of this invention is herein presented, but it will, of course, be appreciated that the invention is susceptible of incorporation in other forms coming equally within the scope of the appended claims.

In the accompanying drawing:

FIGURE 1 is an edge elevational view of the outer fastener half.

FIGURE 2 is a similar view of the inner fastener half.

FIGURE 3 is a plan view showing the two halves of the fastener.

FIGURE 4 is a cross sectional view, taken along the line A—A of FIGURE 3.

Referring now to FIGURE 1, numeral 1 indicates an elongated bar constituting a part of an outer seat belt fastener half, and having one end secured to the free end of a seat belt strap 4. Round magnets 3 are secured in the bar 1 in longitudinally spaced relation to one another. A decorative cover 2, made of plastic or other suitable material, covers the magnets and is secured to an outer side of the bar 1. A number of metal prongs a extend downwardly at an incline from the bar 1, toward said aforementioned end, and are disposed crosswise thereof. The prongs a may be stamped or otherwise formed out of the bar 1. The magnets 3 are disposed between the prongs a.

An elongated steel bar 6 constitutes the inner fastener half and has longitudinally spaced transversely disposed slots b to receive the prongs a. Slots b have inclined edges to conformably engage the prongs a.

The other end of the bar 1 is inclined outwardly, as seen in FIGURE 1, to form a release tab which will be manufactured in an easily identified color to identify it as the release tab.

FIGURE 3 shows the inner and outer fastener halves of the safety catch fastened together. Portions of the side edges of the bar 6 are bent upwardly to provide flanges 7 which serve as a guide for the bar 1. The free end of a seat belt strap 5 is connected to the end of the bar 6 which is disposed remote from the flanges 7 and from the end of the bar 1 to which the strap 4 is secured. The particular way these inner and outer fastener halves are made will make it impossible for these magnets to pull into proper safety catch position until they are in the correct position in relation to the safety latch.

Having thus completely and fully described the invention, what is now claimed as new and desired to be protected by Letters Patent of the United States is:

1. A magnetic seat belt fastener comprising a first elongated bar of a magnetizable material constituting an inner fastener half, a first seat belt strap fastened to one end of said bar, said bar having longitudinally spaced transversely disposed slots, a second elongated bar, constituting an outer fastener half, having longitudinally spaced transversely disposed prongs depending therefrom and positioned to be received in said slots, a magnet mounted in the second bar between the prongs and releasably holding the bars in engagement with one another when the prongs are disposed in the slots, and an end of a second seat belt strap being connected to an end of the second bar and remote from the end of the first bar to which the first seat belt strap is fastened.

2. A magnetic seat belt fastener as in claim 1, said prongs being inclined toward said second seat belt strap and said slots having inclined edges conformably engaging against said prongs.

3. A magnetic seat belt fastener as in claim 1, said first bar having a smooth inner side to engage the user, and said second bar being differently shaped and differently textured from the first bar to enable the fastener halves to be easily identified in the dark.

4. A magnetic seat belt fastener as in claim 1, the other end of the second bar constituting a released tab having a brightly colored luminous coating for easy identification and for quick release in an emergency.

5. A magnetic seat belt fastener as in claim 1, said first bar having flanges projecting upwardly from the side edges thereof and between which the second bar is received to facilitate the connecting of the fastener halves.

References Cited

UNITED STATES PATENTS

| 389,037 | 9/1888 | Wilkinson. |
| 3,127,650 | 4/1964 | Seward. |
| 3,266,112 | 8/1966 | Heckman. |

FOREIGN PATENTS

| 1,050,103 | 2/1959 | Germany. |

BERNARD A. GELAK, Primary Examiner.